United States Patent [19]

Toba et al.

[11] Patent Number: 5,460,530
[45] Date of Patent: Oct. 24, 1995

[54] ARRANGING METHOD OF A WIRE HARNESS FOR A DOOR

[75] Inventors: Katsuaki Toba; Yutaka Noro, both of Mie, Japan

[73] Assignee: Sumitomo Wiring Systems, Ltd., Mie, Japan

[21] Appl. No.: 337,460

[22] Filed: Nov. 4, 1994

Related U.S. Application Data

[63] Continuation of Ser. No. 951,833, Sep. 28, 1992, abandoned.

[30] Foreign Application Priority Data

Sep. 26, 1991 [JP] Japan ..................... 3-277245

[51] Int. Cl.⁶ ............................................. H01R 33/00
[52] U.S. Cl. ...................... 439/34; 174/72 A; 439/557
[58] Field of Search ................. 439/34, 557; 174/72 A; 49/502; 29/854, 857, 755, 869

[56] References Cited

U.S. PATENT DOCUMENTS

| | | | |
|---|---|---|---|
| 3,769,701 | 11/1973 | Kloth | 29/867 |
| 4,800,648 | 1/1989 | Nakayama et al. | 29/854 |
| 4,818,236 | 4/1989 | Nakayama | 439/34 |
| 4,848,829 | 7/1989 | Kidd | 174/72 A |
| 4,869,670 | 9/1989 | Ueda et al. | 49/502 |
| 4,907,836 | 3/1990 | Ueda et al. | 296/39.1 |
| 4,943,109 | 9/1990 | Skrbina | 439/34 |
| 4,943,241 | 7/1990 | Watanabe et al. | 439/34 |

FOREIGN PATENT DOCUMENTS

| | | |
|---|---|---|
| 0334343 | 9/1989 | European Pat. Off. . |
| 3530413 | 2/1987 | Germany . |
| 3842340 | 6/1990 | Germany . |
| 61-9111 | 1/1986 | Japan . |

Primary Examiner—Neil Abrams
Attorney, Agent, or Firm—Sughrue, Mion, Zinn, Macpeak & Seas

[57] ABSTRACT

An arranging method of a wire harness for a door aims to make it easy to arrange a wire harness 4 in a door 1 for a motor vehicle. The wire harness 4 is divided into a frame side harness 4a and a trim side harness 4b. The frame side harness 4a for an electrical equipment on a door frame 2 is arranged on an interior 2a of the door frame 2. The trim side harness 4b for electrical equipments 6 and 7 is arranged on an interior 3a of a door trim 3. The door trim 3 having the trim side harness 4b is coupled to the door frame 2 having the frame side harness 4a.

1 Claim, 9 Drawing Sheets

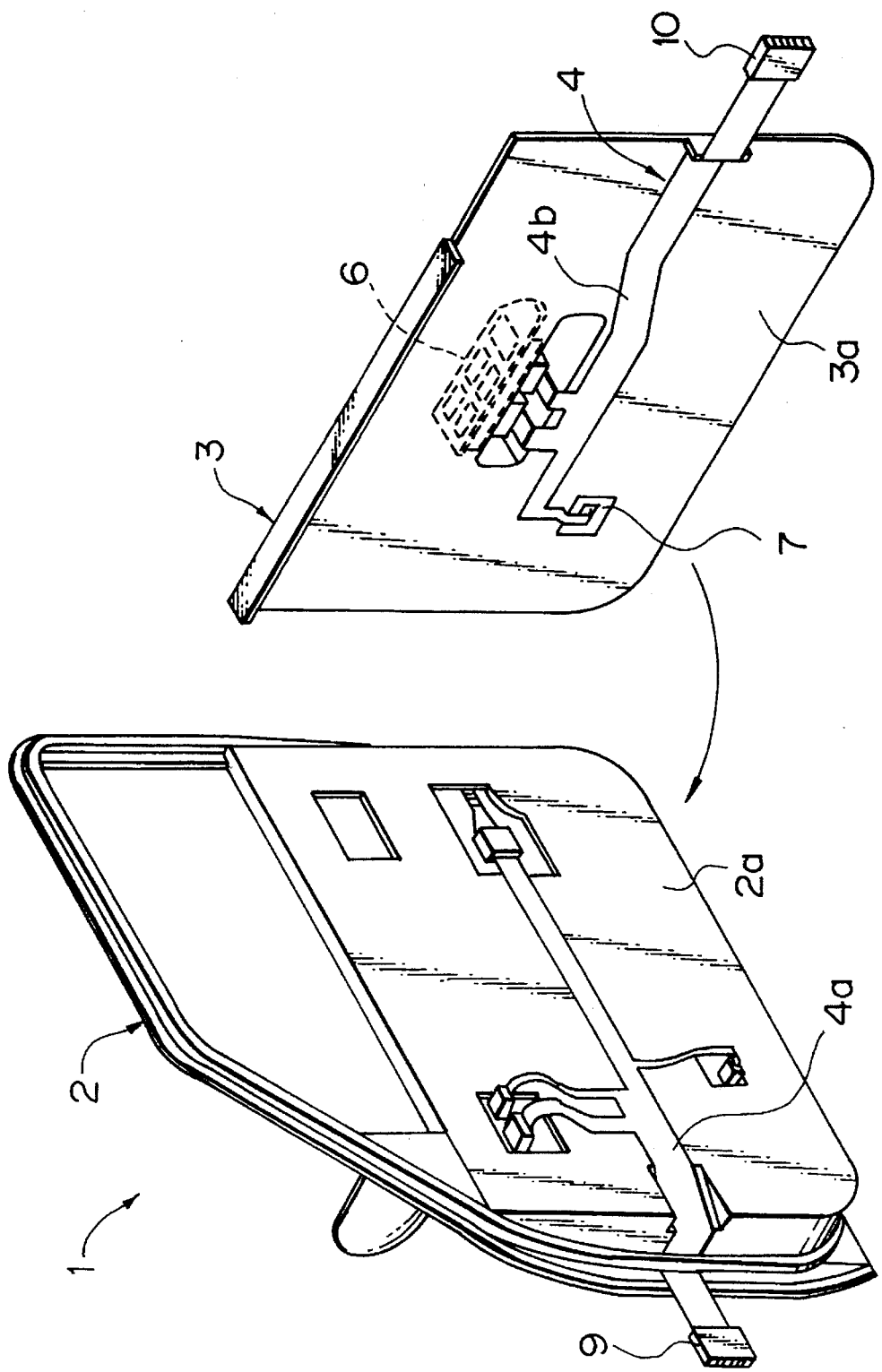

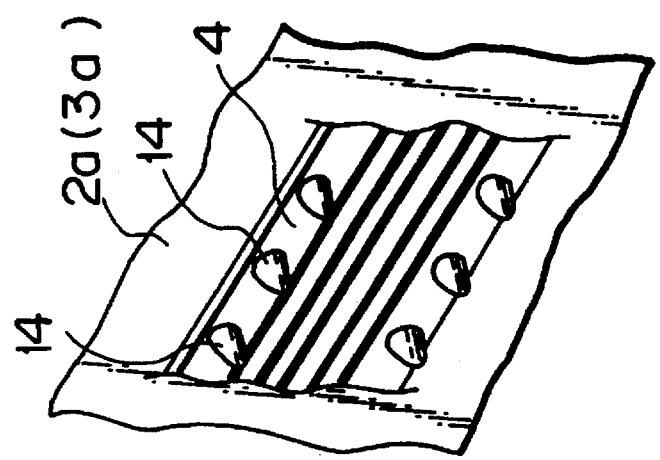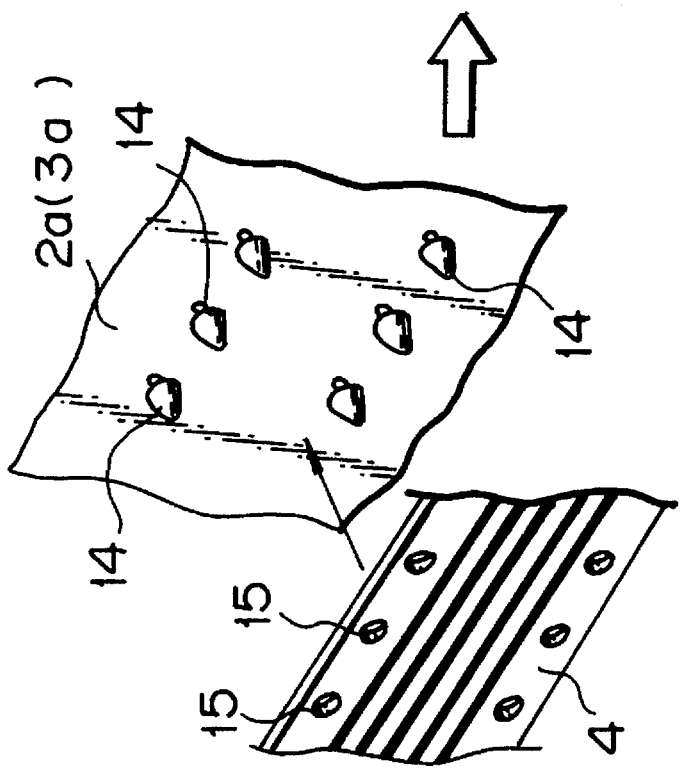

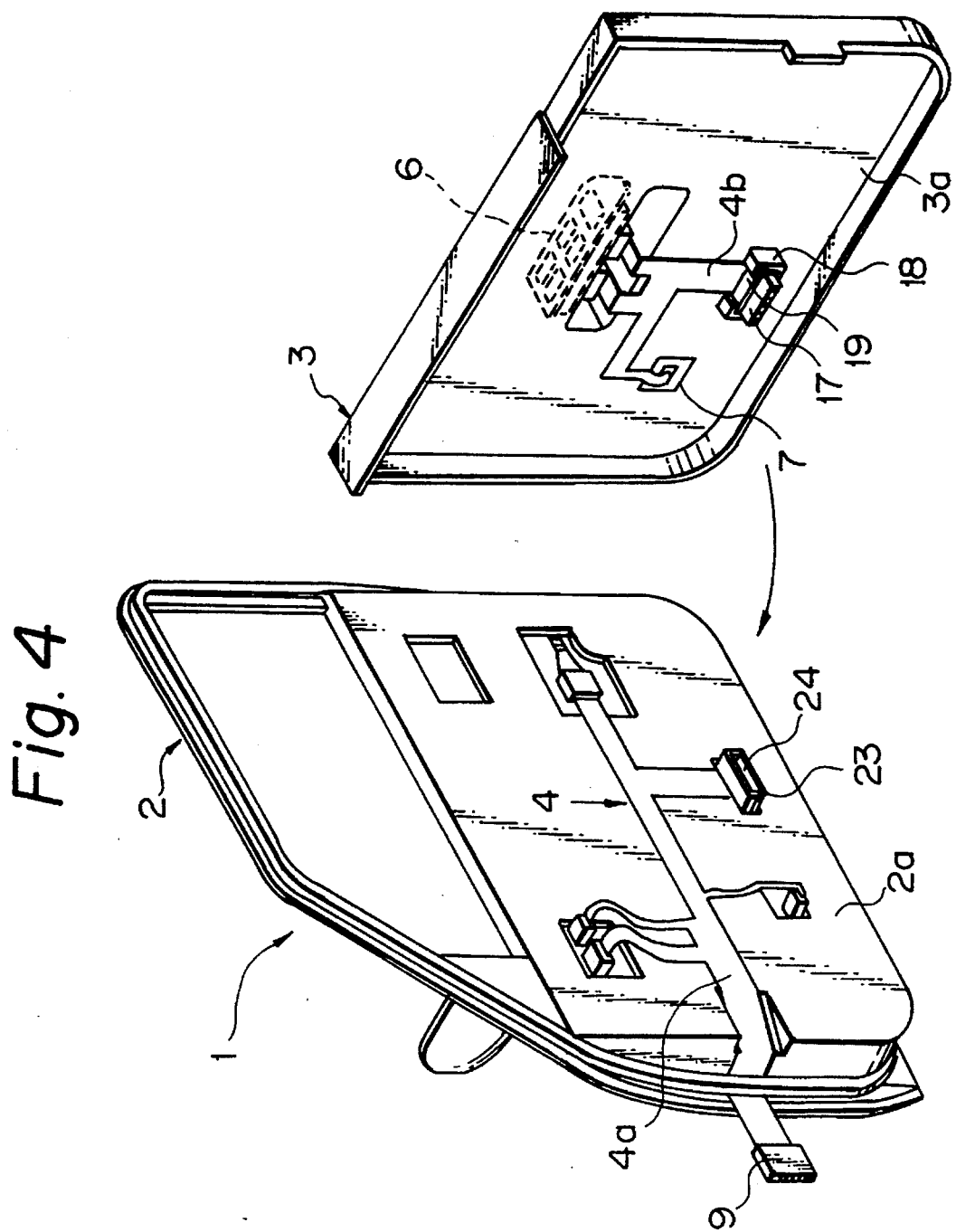

ARRANGING METHOD OF A WIRE HARNESS FOR A DOOR

This is a Continuation of application Ser. No. 07/951,833 filed Sep. 28, 1992.

BACKGROUND OF THE INVENTION

1. Field of the Invention

This invention relates to an arranging method of a wire harness for a door in a motor vehicle.

2. Statement of the Prior Art

A door of a motor vehicle comprises an outside door frame and an inside door trim as an interior covering plate. In the door, a wire harness connected to electrical equipment such as speakers, a motor for power windows, a motor for remote-controlled mirrors courtesy lights, various kinds of switches, and the like is arranged. An end of the wire harness which is drawn out of the door is connected to a wire harness on the car body through a connector.

A process for arranging the wire harness through the door frame is unavoidably carried out under a blind operation and thus lowers the efficiency of arrangement of the wire harness in the door. In order to overcome this problem, some methods for decreasing steps of arrangement in the door have been proposed in, for example, Japanese Patent Public Disclosure Nos. 61-9111 (1896) and 61-73511 (1986) and Japanese Utility Model Public Disclosure No. 61-35318 (1986).

In the arranging method disclosed in Japanese Patent Public Disclosure No. 61-9111 (1986), however, when the door trim is coupled to the door frame with a part of branched lines being beforehand connected to the electrical equipment provided on the door trim in the arranging step of a flat-like wire harness, it is necessary to connect the other branched lines to the electrical equipment provided on the door frame. This connecting process of the branched lines and the electrical equipment on the door frame must be carried out in a narrow space between the door frame and the door trim and is therefore difficult. Also, the arranging method disclosed in Japanese Utility Model Public disclosure No. 61-35318 (1986) requires difficult connecting work of the branched lines and the electrical equipment on the door frame.

Further, the arranging method disclosed in Japanese Patent Public Disclosure. No. 61-73511 (1986) has proposed that a connector on the wire harness is connected to a connector on the electrical equipment provided on the door trim by coupling a circuit plate to a given position of the door trim, the connector on the wire harness then being connected to the connector on the electrical equipment provided on the door trim by coupling the door trim to a given position of the door frame. This method makes it easy to connect the wire harness to the respective electrical equipment. However, the weight of the door will be increased and the cost will be high since it is necessary to provide an additional circuit plate.

SUMMARY OF THE INVENTION

An object of the present invention is to provide an arranging method of a wire harness for a door, in which the wire harness is readily arranged in the door without using and additional circuit plate. In order to achieve the above object, a method of arranging a wire harness in a motor vehicle door having an outside door frame and an inside door trim, in accordance with the present invention comprises the steps of:

dividing said wire harness into a frame side harness to be arranged on an electrical equipment on the door frame side and a trim side harness to be arranged on the electrical equipment on the door trim side;

arranging said frame side harness and said trim side harness on the opposed interiors of said door frame and said door trim; and coupling said door trim having said trim side harness to said door frame having said frame side harness.

A trim side connector which is provided in a given posture on an end of said trim side harness arrange on said door trim is connected to a frame side connector which is provided in a given posture opposite to said trim side connector on an end of said door frame harness arranged on said door frame when said door trim is coupled to said door frame.

Either said trim side connector or said door side connector is provided with a circuit-branching box which serves to branch the circuit.

The present invention can simplify and ease the respective arranging work, since the wire harness is divided into the frame side harness and the frame side harness is arranged for the electrical equipment on the door frame while the trim side harness is arranged for the electrical equipment on the door trim.

The present invention does not require the connecting work in a narrow space, since the arranging work of the wire harness in the door is completed by coupling the door trim to the door frame.

Also, the trim side connector is connected to the frame side connector by coupling the door trim to the door frame and then the electrical equipment on the door frame and the door trim is electrically connected with each other.

In addition, any branching circuits are eliminated from the wire harness and the wire harness itself is simplified by using the circuit-branching box which serves to branch the circuit in either trim side connector or frame side connector.

BRIEF DESCRIPTION OF THE DRAWINGS:

FIG. 1 is a perspective view of a door of a first embodiment of the present invention;

FIGS. 3A and 3B are perspective views of another attaching construction of the wire harness;

FIG. 4 is a perspective view of door of a second embodiment of the present invention;

Figure 2A:
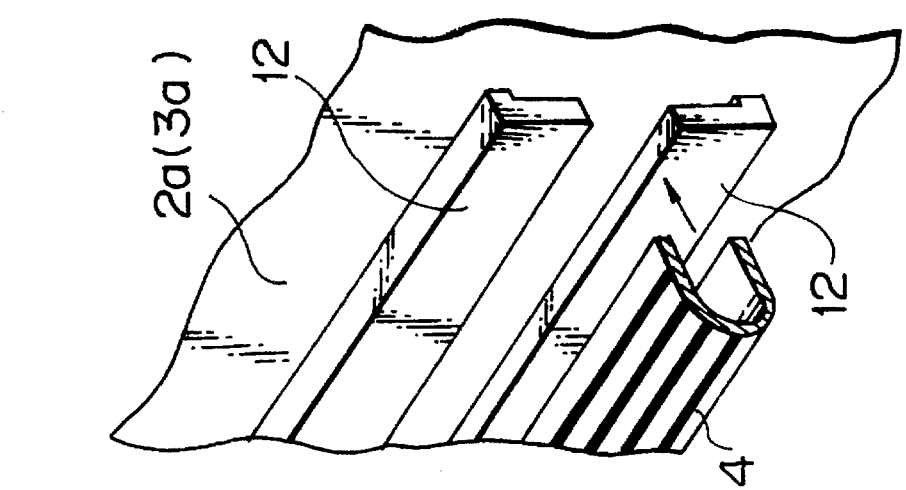
FIGS. 2A and 2B are perspective views of an attaching construction of wire harness.

DETAILED DESCRIPTION OF THE PREFERRED EMBODIMENTS:

A first embodiment of the present invention will be explained by referring to the drawings. In FIG. 1, a door 1 for a motor vehicle comprises an outer door frame 2 and a door trim 3 to be coupled to the interior of the door frame 2.

A wire harness 4 is divided into a frame side harness to be arranged on the door frame 2 and a trim side harness 4b to be arranged on the door trim 3. The frame side and trim side harnesses 4a and 4b are made of flexible flat plates such as an FPC, an FFC, or the like and are mounted on opposed interiors 2a and 3a on the door frame 2 and the door trim 3.

An electrical equipment such as remote-controlled mirrors, power windows, speakers, and the like is carried on the door frame 2. Each item of the electrical equipment is connected to the frame side harness 4a, respectively.

The door trim 3 is provided with items of the electrical equipment such as switches 6 for the power windows, a courtesy light 7, and the like which are connected to the trim side harness 4b, respectively.

Front ends of the frame side harness 4a and the trim side harness 4b project from front ends of the door frame 2 and the door trim 3 and are connected to main connectors 9 and 10 which are connected to the wire harness on a car body.

In the case of arranging the wire harness 4 in the door 1, it is necessary to independently carry out a step of arranging the frame side harness 4a on the door frame 2 and a step of arranging the trim side harness 4b on the door trim 3.

After the door trim 3 having the trim side harness 4b is coupled to the door frame 2 having the frame side harness 4a, the arranging work of the wire harness 4 in the door 1 is completed.

Since the wire harness 4 is independently on the door frame 2 and the door trim 3, as mentioned above, the arranging work is simplified and can be made easier by not being subject to limitation of an arranging space. Then the door trim 3 is merely coupled to the door frame 2. In the present invention, the arranging work does not need to be carried out in the narrow space between the door trim 3 and the door frame 2, as in the above prior art. Accordingly, the arranging work of the wire harness 4 in the door 1 is made easier and can particularly improve an efficiency in comparison with the prior art. The present invention does not need the conventional circuit plate and can prevent increase of a door weight and cost.

Figure 2B:
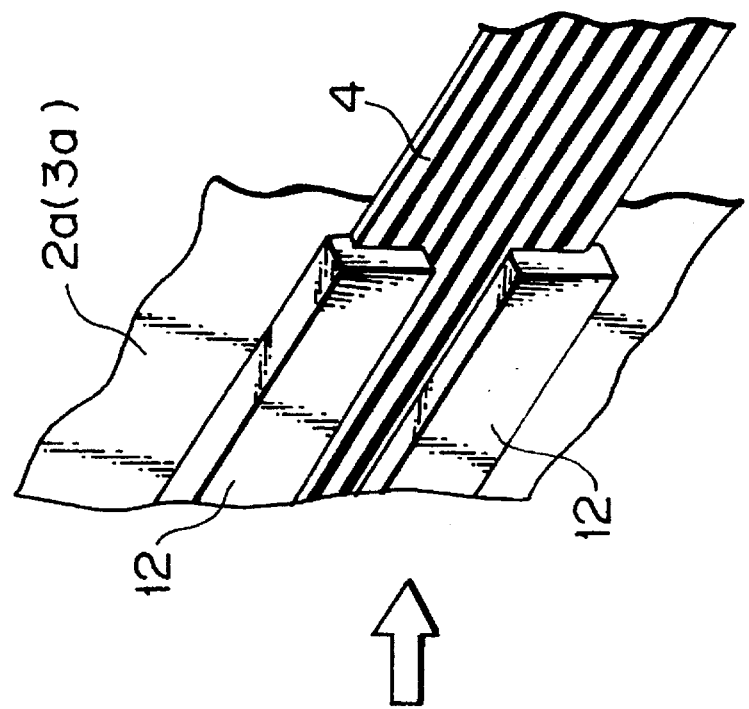
Figure 5:
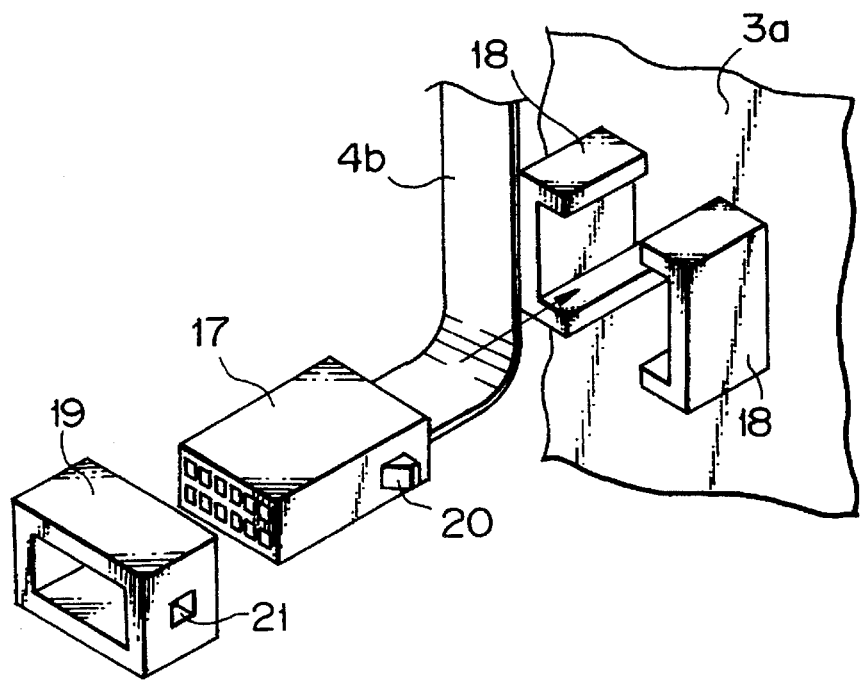
FIG. 5 is an exploded perspective view of a supporting construction of a trim side connector.

An attachment of the wire harness 4 on the interior 2a of the door trim 2 and the interior 3a of the door trim 3 can be effected by sticking through an adhesive, fitting through elastic deformation of a pair of guides 12 projecting from the interiors 2a and 3a, as shown in FIGS. 2A and 2B, or fitting elastic protrusions 14 made of a rubber material, which projects from the interiors 2a and 3a, into holes 15 formed in the wire harness 4, as shown in FIGS. 3A and 3B.

Figure 6:
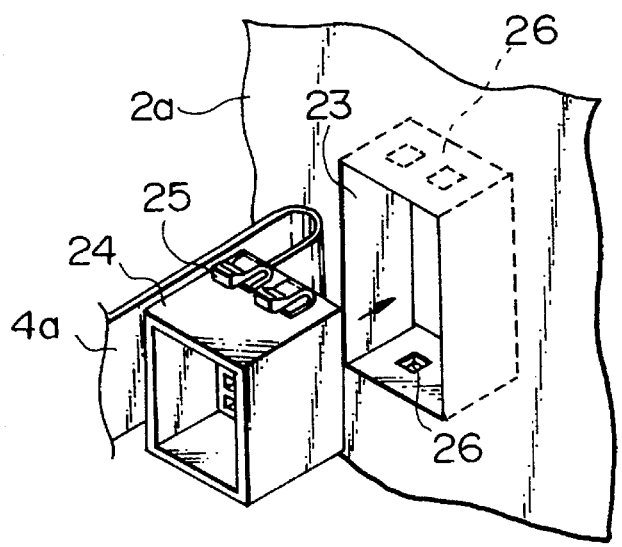
FIG. 6 is an exploded perspective view of, a supporting construction of a frame side connector.

A second embodiment of the present invention is shown in FIGS. 4 and 6. A trim side connector 17 is provided on an end of the trim side harness 4b arranged on the door trim 3. A U-shaped connector support 18 projects towards the door frame 2 on the center and lower portion of the door trim 3. A rubber ring 19 is fitted on the outer periphery of the trim side connector 17 and the trim side connector 17 together with the rubber ring 19 are pressed and inserted into the connector support 18 with projections 20 on the opposite sides of the connector 17 being engaged with holes 21 in the rubber ring 19 to prevent slippage of the ring. The trim side connector 17 is held in the plane perpendicular to the direction towards the door frame 2 so that the connector 17 can move slightly in the upper, lower, right and left directions in the support 18 through elastic deformation of the rubber ring.

On the other hand, a connector support recess 23 is provided on the door frame 2 in opposition to the trim side connector 17. A frame side connector 24 is connected to an end of middle portion branched from the frame side harness 4a on the dooreframe 2. The frame side connector 24 is mated in the connector support recess 23 with resilient protrusions 25 provided on the opposite sides of the connector 24 being engaged with holes 26 in the recess 23. The frame side connector 24 is held in the recess 23 so that the connector is permitted to more slightly in only one direction through the resilient protrusions 25.

When the door trim 3 with the trim side harness 3a is coupled to the door frame 2 with the frame side harness 2a as shown in FIG. 4, the trim side connector 17 is automatically connected to the frame side connector 24. At this time, a small gap between the connectors 17 and 24 is effectively absorbed in the flexibility between the rubber ring 19 and the protrusions 25. Consequently, a positive connection can be achieved.

This method is effective in a circuit connection between the electrical equipment on the door frame 2 and door trim 3. The connecting work of the circuits can be readily carried out.

At least one of the connectors 17 and 24 may be held in the posture flexibly.

Figure 7:
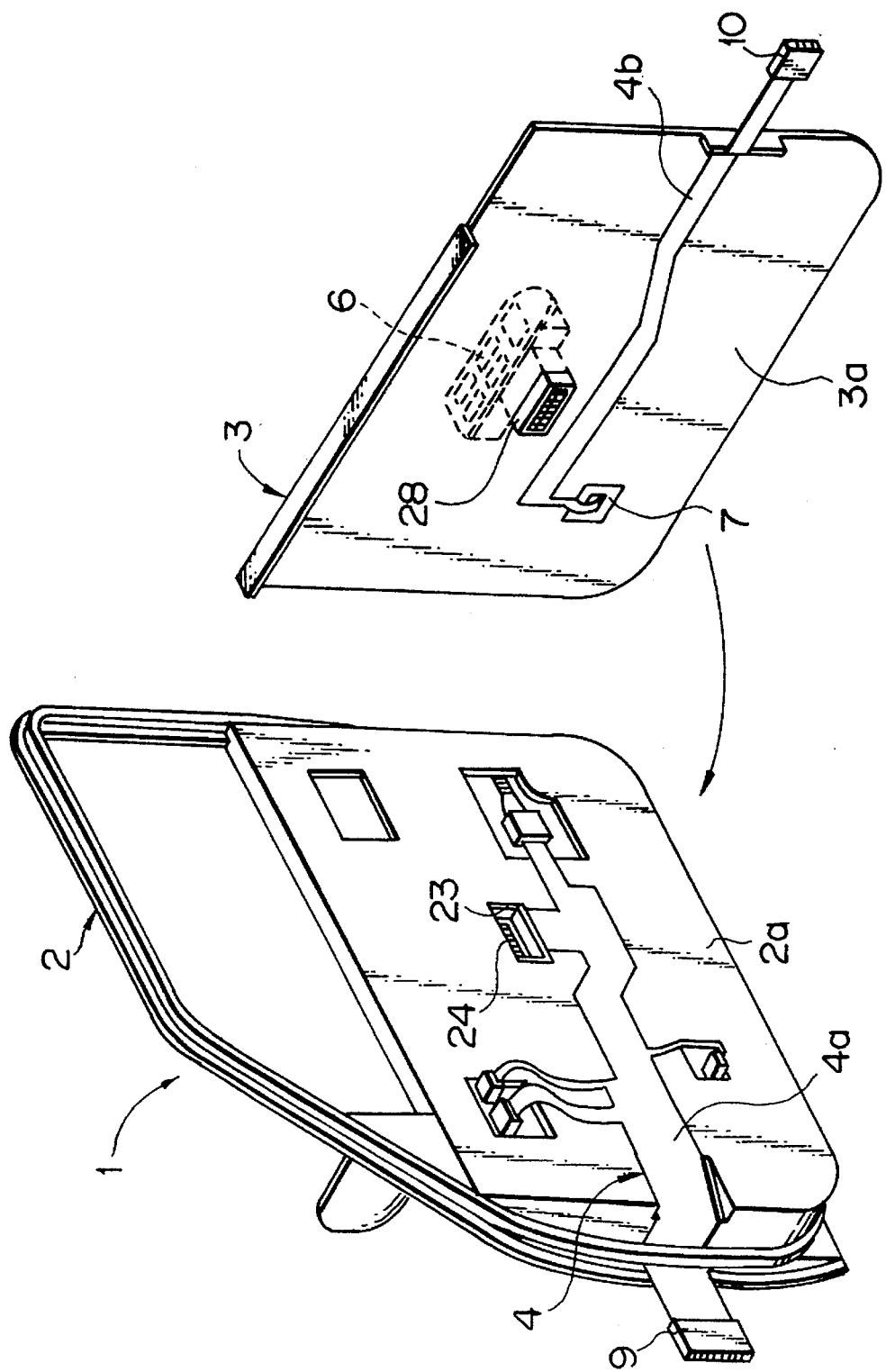
FIG. 7 is a perspective view of a door of a third embodiment of the present invention.

FIG. 7 shows a third embodiment of the present invention A connector 28 is provided adjacent to switches 6 on the door trim 3. The frame side connector 24 is provided on the door frame 2 with a slight flexibility in opposition to the connector 28. When the door trim 3 is coupled to the door frame 2, the connector 28 is connected to the frame side connector 24.

A unit base plate for the switches 6 may be provided with a circuit-branching,function for the frame side harness 4a.

Figure 8:
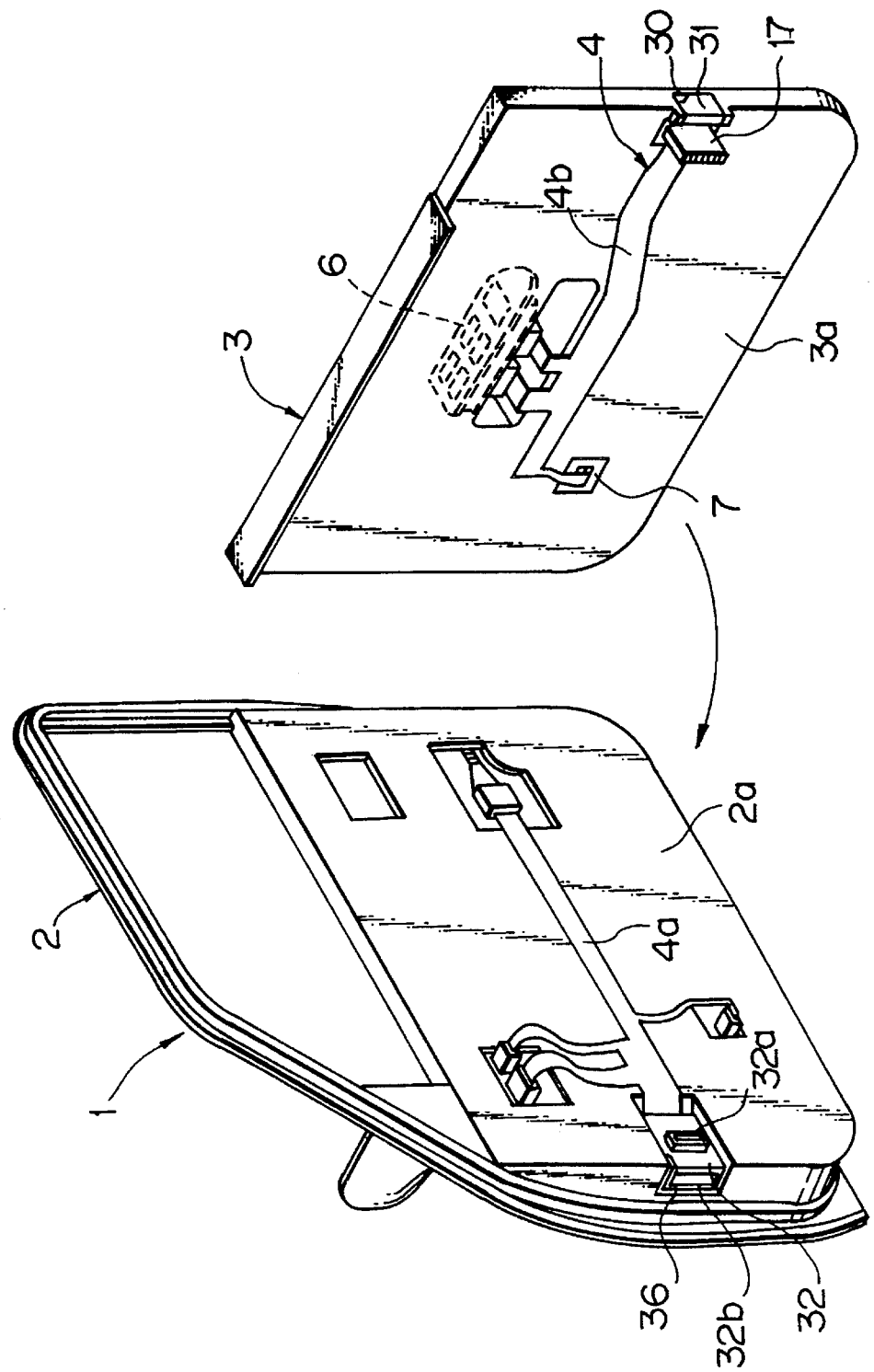
FIG. 8 is a perspective view of a door of a fourth embodiment of the present invention.
Figure 9:
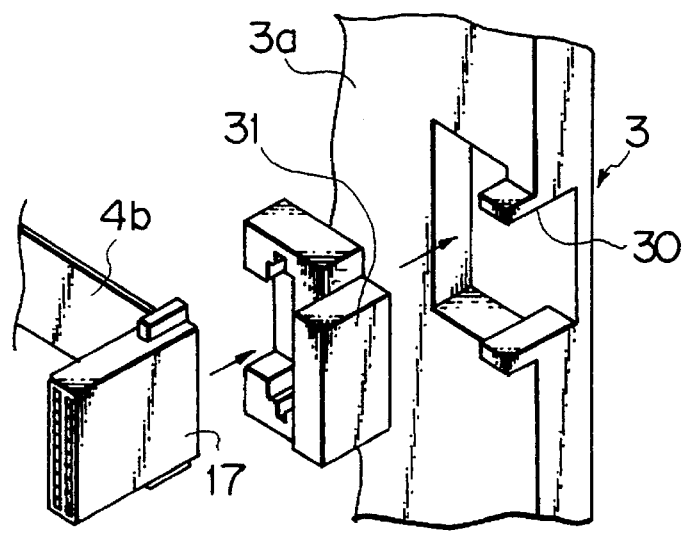
FIG. 9 is an exploded perspective view of a supporting construction of the trim side connector.
Figure 10:
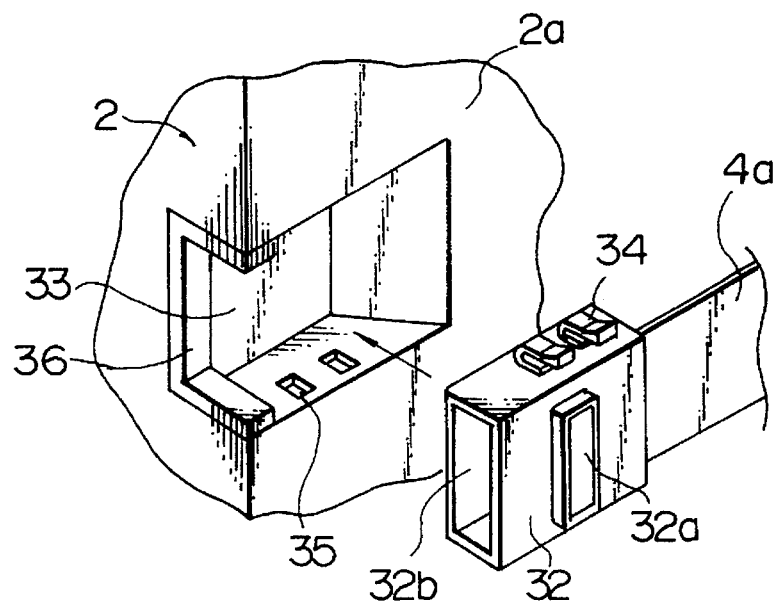
FIG. 10 is an exploded perspective view of a supporting construction of a circuit-branching box.

FIGS. 8 through 10 show a fourth embodiment of the present invention. The trim side connector 17 is pressed and inserted through a rubber support block 31 in a connector support recess 30 provided on a front side end of the interior 3a of the door trim 3 with the connector being held in the recess 30 with a slight flexibility. On the other hand, the frame side connector is a circuit-branching box 32 which serves to branch the circuit. The circuit-branching box 32 is mounted in a box support recess 33 provided on a front side end of the interior 2a of the door frame 2 in opposition to the trim side connector 17.

At this time, resilient protrusions 34 provided on the opposite side of the circuit-branching box 32 are engaged with holes 35 provided in the box support recess 33. The circuit-branching box 32 is held in a U-shaped rubber support 36 mounted on a front side edge in the recess 33 so that the box 32 can be slightly moved. In this position, a connector 32a of the box 32 is directed to the trim side connector 17 on the door trim 3 so that the connector 32a can receive the connector 17 while a main connector 32b is directed to a car body side connector so that the main connector 32b can receive the car body side connector. When the door trim 3 is, coupled to the door frame 2, the trim side connector 17 is connected to the connector 32a of the circuit-branching box 32.

The connector 24 may be provided on the door frame 2 and also the circuit-branching box 32 may be provided on the door trim 3. Also, the connectors 17 and 24 may be provided on both door frame 2 and door trim 3 and a car body side portion to be connected to the wire harness 4 in the door 1 may be the circuit-branching box.

Since the above circuit-branching box 32 can include not only a circuit across the door frame 2 and the door trim 3 but also all branched circuits in the frame side harness 4a and the trim side harness 4b, the wire harness 4 itself can be made of a circuit conductor with no branches, for example, an FFC in a simple circuit, a ribbon cable, or the like.

Figure 11:
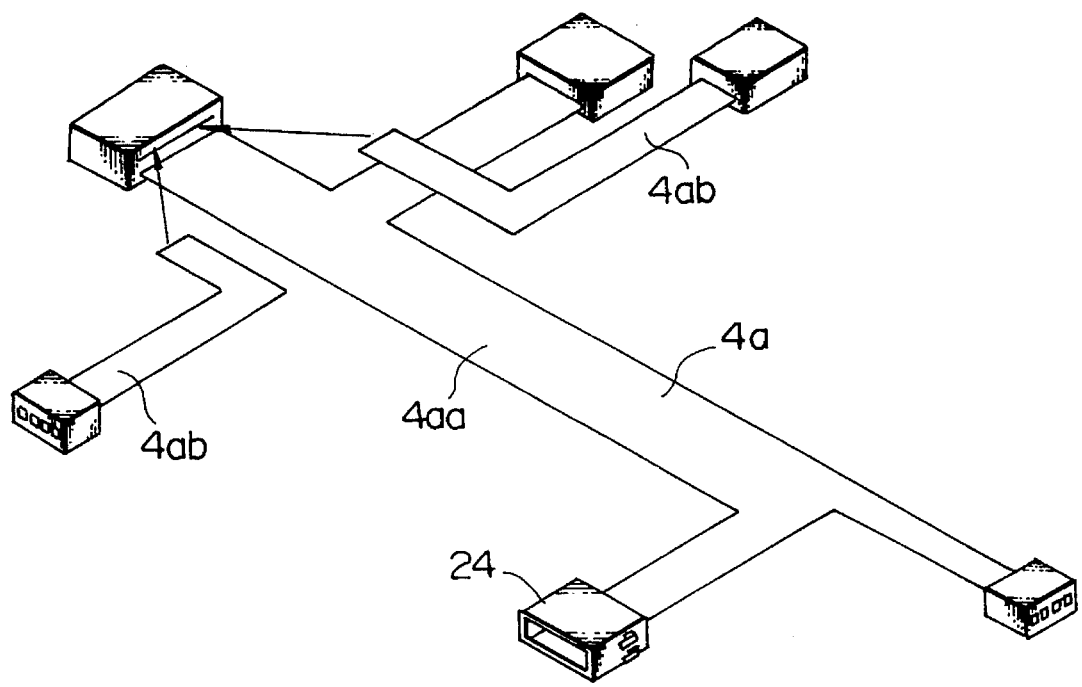
FIG. 11 is a perspective view of a frame side harness of a fifth embodiment of the present invention.

FIG. 11 shows a fifth embodiment. The frame side harness 4a is divided into a basic harness 4aa and a plurality of option harnesses 4ab. In general, motor vehicles, even if they are similar models, have different devices in accordance with their grade or optional extras, and thus this results in different electrical equipments being required to be mounted in the door. Accordingly, the basic harness 4aa is used in a grade of a standard specification and the option harness 4ab is combined according to requirements The trim side harness 4b may be divided into a basic harness and option harnesses in the same manner as the frame side harness 4a.

Although the above embodiment uses the flexible flat base plate as the wire harness 4, the present invention can utilize electric wires in the same manner as the conventional method.

The arranging method of the wire harness for the door in accordance with the present invention divides the wire harness into the frame side harness and the trim side harness, arranges them on the door frame and trim, respectively, and then couples the door trim to the door frame. Consequently, the arranging work of the wire harness is simplified and made easier. The method of the present invention does not need the conventional circuit plate and does not require the connecting work in the narrow space. Accordingly, the method can carry out the arranging work of the wire harness easily and improve the efficiency of the work. By coupling the door trim to the door frame, the trim side connector and the frame side connector are interconnected and the circuit is readily connected across the door trim and door frame.

The circuit-branching box which has the function of branching the circuit can simplify the wire harness itself.

What is claimed is:

1. A method of arranging a flexible flat plate wire harness in a motor vehicle door including an outside door frame having mounted thereon electrical equipment and an inside door trim having mounted thereon electrical equipment, comprising the steps of:

dividing said flexible flat plate wire harness into a frame side, flexible flat plate harness having branched ends with connectors and which is electrically connected at each branched end through each connector to the electrical equipment on the door frame side and a trim side, flexible flat plate harness having branched ends with connectors and which is electrically connected at each branched end through each connector to the electrical equipment on the door trim side;

arranging said frame side flexible flat plate harness and said trim side, flexible flat plate harness on the opposed interiors of said door frame and said door trim, respectively; and coupling said door trim having said trim side, flexible flat plate harness to said door frame having said frame side, flexible flat plate harness, wherein a trim side main connector which is provided in a given posture on an end of said trim side, flexible flat plate harness arranged on said door trim is connected to a frame side main connector which is provided in a given posture opposite to said trim side main connector on an end of said frame side, flexible flat plate harness arranged on said door frame when said door trim is coupled to said door frame, wherein one of said trim side main connector and said frame side main connector is provided with a circuit-branching box which serves to branch the circuit, wherein one of said frame side, flexible flat plate harness and said trim side, flexible flat plate harness is divided into a basic harness and a plurality of optional harnesses.

* * * * *